June 1, 1965 W. O. RAMSER 3,186,046
APPARATUS FOR THE PREPARATION OF ALLOY CONTACTS
Filed June 10, 1959
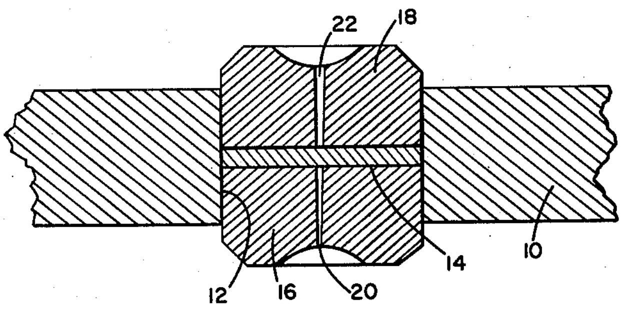
INVENTOR.
WALTER O. RAMSER
BY
ATTORNEY

United States Patent Office 3,186,046
Patented June 1, 1965

3,186,046
APPARATUS FOR THE PREPARATION OF ALLOY CONTACTS

Walter Otto Ramser, Nurnberg, Germany, assignor to Clevite Corporation, Cleveland, Ohio, a corporation of Ohio Filed June 10, 1959, Ser. No. 819,364
8 Claims. (Cl. 22—216)

This invention relates to methods and apparatus for the fabrication of semiconductor devices such as diodes and transistors and more particularly to the formation of P-N junctions by alloying.

As is well known in the art, junction type semiconductor devices are commonly manufactured by an alloying process in which a tiny pellet or "pill" of a suitable alloying material is placed on a wafer of semiconductor material and the assembly subjected to elevated temperatures. The pellet melts and alloys with the contiguous material of the semiconductor wafer and, upon cooling, recrystallizes to form the desired junction. In the case of a junction diode only one junction is formed on the wafer. For transistors, two P-N junctions are required, one on each side of the wafer, and particularly in the case of high frequency transistors it is very important that the centers of the alloy regions be exactly aligned opposite each other.

Heretofore, the usual practice has been to carry out this alloying procedure with the use of an alloying fixture known as a "jig" or "boat." Conventionally such a fixture comprises a two part graphite mold containing bores into which the pellets of alloying material are placed. The use of graphite molds has various disadvantages. Ordinarily graphite is quite porous with the result that the alloying material adheres to the sides of the bores and, upon heating to affect the alloying, the droplet of molten alloying material hangs in the bore and only partially flows on to the semiconductor wafer. The use of pore-free graphite is unsatisfactory because the edges of the mold crumble when the bores are drilled. Even where porous graphite is used the edges of the molds crack easily in boring and during the removal of the alloyed wafer. Consequently on re-use of the mold, the junction regions formed are irregular and larger than desired and this condition worsens with progressive use of the molds.

The wear of the edges of graphite molds is of particular detriment in the preparation of high frequency transistors. Experiments have shown that after using a graphite mold only ten times it was substantially impossible to properly align the respective alloy regions on the opposite faces of the wafer. As a result of these difficulties it is necessary to replace graphite molds quite often. Another disadvantage of graphite alloying fixtures is that graphite tends easily to absorb metal vapors which contaminates or otherwise adversely influences the alloying process on subsequent re-use.

It is the fundamental object of the present invention to overcome at least one of the disadvantages of the prior art as outlined above.

A more specific object is the provision of a novel alloying fixture which is re-usable indefinitely and is not subject to deterioration due to wear.

Another object of the invention is a novel alloying fixture which is easily cleaned, does not become impregnated with contaminating materials and which retains initial dimensions throughout a large number of repeated uses.

Still another object of the invention is the provision of a novel method and apparatus for reproducibly and economically forming alloy junctions with a high degree of precision as to size and location.

These and further objects of the invention are accomplished by an apparatus for forming P-N junction alloy regions on a semiconductor wafer comprising a plate containing at least one aperture adapted to contain such a wafer of semiconductor material and an horological jewel adapted to be coaxially received in said aperture and in abutment with one face of a wafer therein containing an axial bore having a diameter corresponding to that of the alloy region to be formed on said face of such a wafer.

Briefly stated, the method contemplated by the invention comprises disposing a wafer of semiconductive material coaxially within an aperture in a plate and then inserting a bored horological hole jewel coaxially into the aperture and into abutment with one face of the wafer. Alloying material then is placed in the bore in the jewel and the assembly heated to alloying temperature.

Additional objects of the invention, its advantages, scope, and the manner in which it may be practiced will be apparent to those skilled in the art from the following description and subjoined claims taken in conjunction with the annexed drawing in which the single figure is a vertical section view of an exemplary form of alloying fixture in accordance with the invention.

Referring now to the drawing, reference numeral 10 designates a plate of steel or other suitable material capable of withstanding the temperatures normally encountered in the alloying processes in which the fixture is to be used. Steel plate 10 is provided with at least one circular aperture 12 of a diameter conforming to that of a semiconductor wafer 14 to be alloyed. Where a square wafer is employed, the diameter of bore 12 corresponds to the diagonals of the wafer. It will be appreciated that, while a single aperture 12 has been illustrated in the interest of simplicity and brevity any reasonable number of such apertures can be used in a single plate.

After semiconductor wafer 14 has been inserted in bore 12 a pair of horological hole jewels 16 and 18 are inserted into the respective ends of the bore so that the wafer is sandwiched between the two jewels.

As is known in the horological art, watch jewels suitable for the practice of this invention are made of ruby or sapphire materials (corundum), usually synthetic, and are commercially available in almost any desired size and containing respective coaxial bores 20 and 22 of any desirable diameter. The respective diameters of jewel bores 20 and 22 would be dictated by the desired diameter of the alloyed region to be formed on wafer 14. Inasmuch as it is customary to form the collector junction larger than the emitter junction, the jewel used on the emitter side of wafer 14, e.g., jewel 16 in the illustrated embodiment, would contain a smaller bore than the jewel 18 on the collector side. For example, emitter jewel 16, may have a bore of 50 to 80 microns diameter and collector jewel 18 a bore of about 200 microns.

It will be appreciated that a single jewel may be used for alloying diodes or where each junction of a transistor is to be alloyed separately.

In using the apparatus, semiconductor wafer 14 is inserted in the aperture 12 followed by jewels 16 and 18 which are positioned one on each side of the wafer. The alloying material (not shown) in suitable form is inserted in respective bores 20 and 22 and the assembly inserted in a suitable alloying furnace. After alloying further fabrication steps are carried out in the usual manner.

Since the geometric shape and dimensions of the fixtures do not change, the P-N junctions formed are completely reproducible as to position and dimension. Moreover the jewels are highly resistant to all acids and most other cleaning reagents and, therefore, are easily and thoroughly cleaned.

While there have been described what at present are believed to be the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed and desired to be secured by United States Letters Patent is:

1. Apparatus for forming a P-N junction alloyed region on a semiconductor wafer, comprising: a plate of heat resistant material having at least one substantially cylindrical aperture extending therethrough substantially perpendicularly to its major surfaces and adapted to receive a semiconductor wafer disposed in a plane parallel to said major surfaces; and a flat disk composed of corundum and having a coaxial bore therein adapted to be coaxially received in said aperture in engagement with one surface of the wafer, the bore in said disk substantially corresponding in diameter to the alloy region to be formed on the wafer.

2. Apparatus for forming a P-N junction alloy region on a semiconductor wafer, comprising: a metal plate having a cylindrical aperture extending therethrough substantially perpendicularly to its major surfaces and adapted to receive a semiconductor wafer disposed in a plane parallel to said major surfaces; and a pair of flat disks composed of corundum and adapted to be coaxially received in said aperture with confronting surfaces in abutment with a wafer of semiconductor material interposed therebetween, each of said disks containing an axial bore adapted to contain alloying material for forming the junction on said wafer and having a diameter corresponding to that of the alloyed region to be formed on the respectively contiguous face of the wafer.

3. Apparatus for forming a P-N junction alloy region on a semiconductor wafer, comprising: a plate of heat resistant material containing at least one aperture adapted to coaxially receive a semiconductor wafer; and a jewel composed of corundum adapted to be coaxially received in said aperture and having a planar surface adapted to abut one face surface of the wafer, said jewel containing an axial bore corresponding in diameter and location to the alloy region to be formed on said one surface of the wafer.

4. Apparatus according to claim 3 including a second jewel composed of corundum adapted to be coaxially received in said aperture and having a second planar surface adapted to abut the other face surface of the wafer, said second jewel containing an axial bore corresponding in diameter and location to the alloy region to be formed on said other face surface of the wafer.

5. Apparatus according to claim 4 wherein said bores are coaxially aligned with respect to said aperture and each other.

6. Apparatus for forming P-N junction alloy regions on semiconductor wafers comprising a metal plate containing at least one through aperture adapted to contain a wafer of semiconductor material; and a pair of jewels composed of corundum adapted to fit into said aperture in engagement with the opposite face surfaces of the wafer and each containing a coaxial bore, the respective bores in said jewels having diameters corresponding to those of the respective alloy regions to be formed on the wafer.

7. Apparatus for forming P-N junction alloy regions on semiconductor wafers, comprising: a steel plate containing at least one aperture adapted to receive, with its major surfaces substantially perpendicular with the axis of said aperture, a wafer of semiconductor material; a pair of jewels composed of corundum adapted to be received in said aperture in engagement with the opposite face surfaces of the wafer, each jewel containing a coaxial bore, the respective bores conforming in diameter to that of the respective alloy regions to be formed on the wafer.

8. An alloying fixture according to claim 7 wherein one of said bores is on the order of 200 microns in diameter and the other bore is on the order of 50 to 80 microns.

References Cited by the Examiner

UNITED STATES PATENTS

| | | | |
|---|---|---|---|
| 776,072 | 11/04 | Krause | 205—26 |
| 1,597,928 | 8/26 | Simons | 205—26 |
| 2,827,758 | 3/58 | Voumard | 58—140 |
| 2,938,328 | 5/60 | Derr et al. | 58—140 |
| 2,939,205 | 6/60 | Sutherland et al. | 148—1.5 X |
| 2,942,568 | 6/60 | Hamilton et al. | 148—1.5 X |
| 2,960,419 | 11/60 | Emeis | 148—1.5 |

FOREIGN PATENTS

| | | |
|---|---|---|
| 794,128 | 4/58 | Great Britain. |
| 332,302 | 10/58 | Switzerland. |

DAVID L. RECK, *Primary Examiner.*

RAY K. WINDHAM, WINSTON A. DOUGLAS, *Examiners.*